Nov. 12, 1968  V. BLUM  3,410,001

DIGITAL-LOGIC TRAINER

Filed March 8, 1966 3 Sheets-Sheet 1

VICTOR BLUM
INVENTOR.

BY

BEEHLER & ARANT
ATTORNEYS

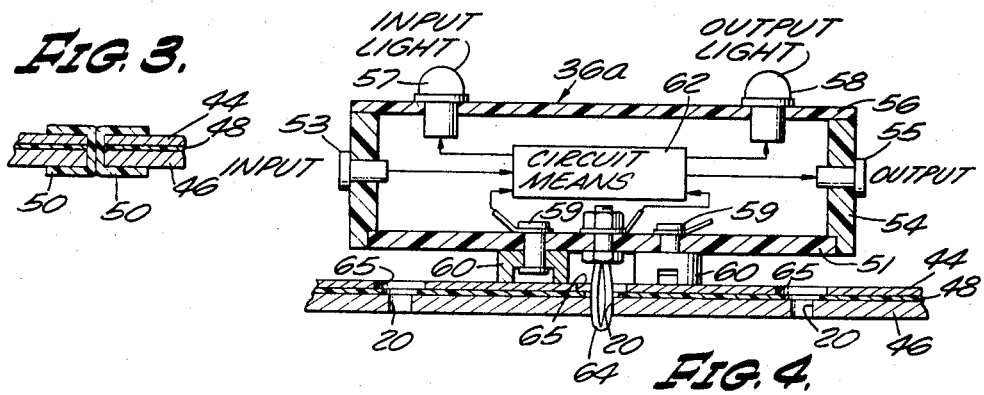
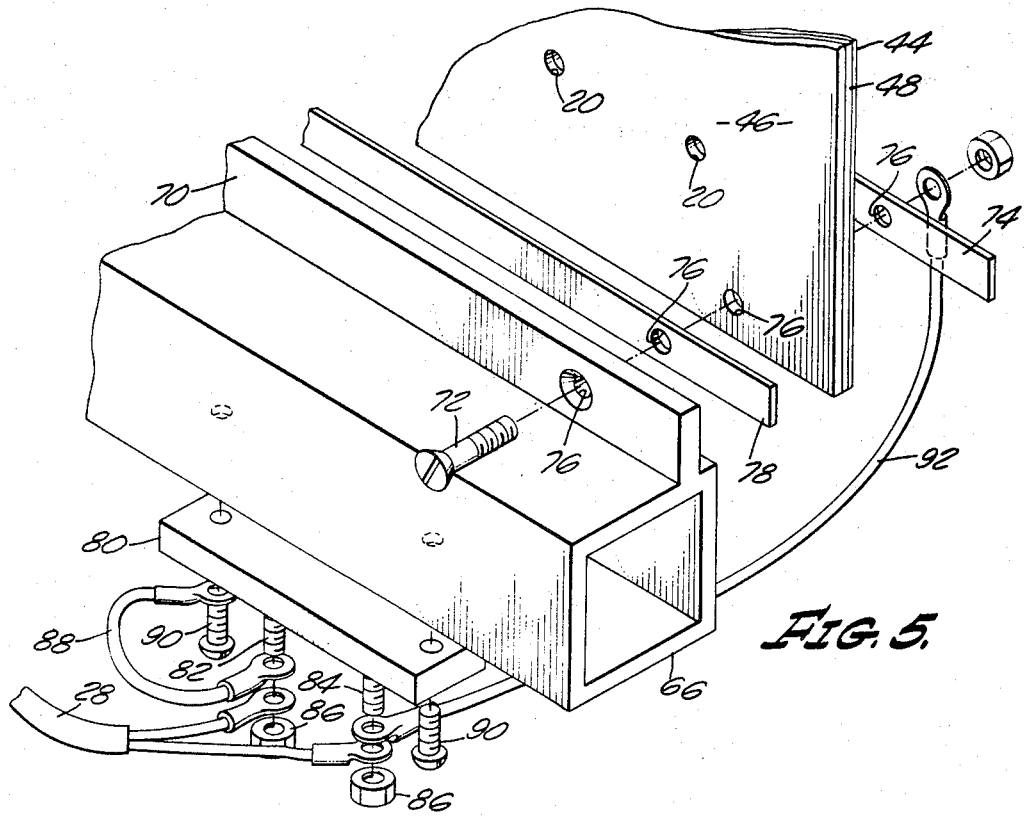
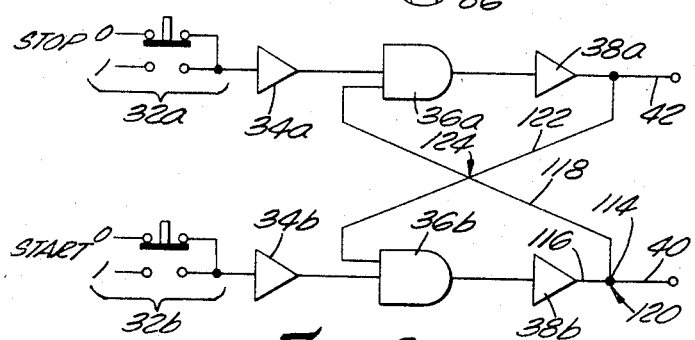

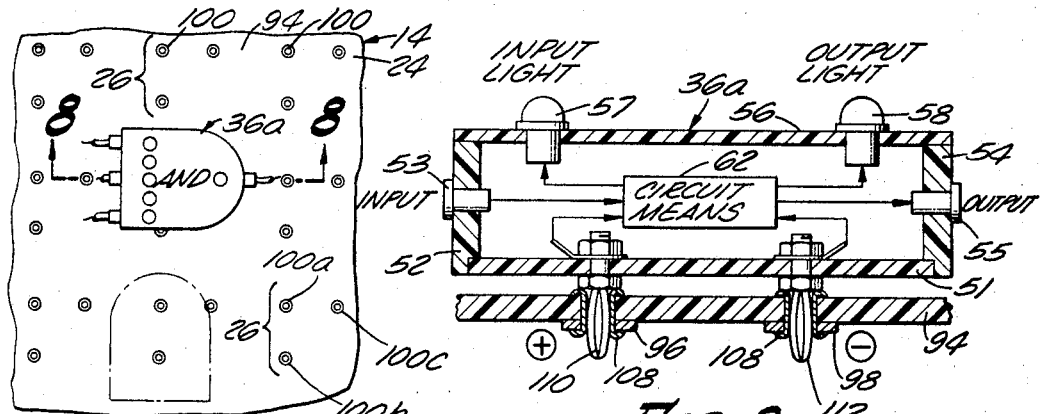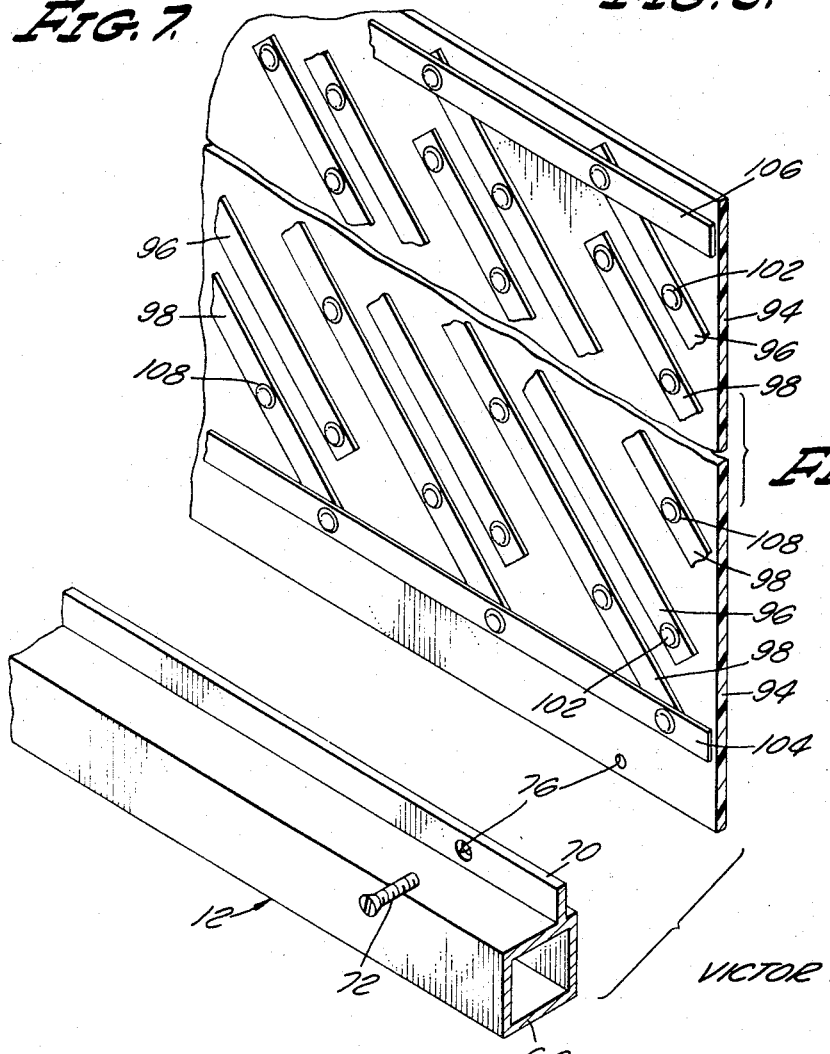

3,410,001
DIGITAL-LOGIC TRAINER
Victor Blum, Alhambra, Calif., assignor of fifty percent to Electronic Calculating Service, Inc., Los Angeles, Calif., a corporation of California
Filed Mar. 8, 1966, Ser. No. 532,785
7 Claims. (Cl. 35—19)

ABSTRACT OF THE DISCLOSURE

A training device for instructing students in digital logic, which includes a large flat panel that is vertically disposed for visual display before the students, locations on the front surface of the panel for attachment of digital devices, a number of digital-logic circuit devices having means for both mechanical and electrical connection to the panel, a power circuit associated with the panel for energizing the digital-logic devices, and circuit connections for making selected logical circuit interconnections between the digital-logic devices displayed on the panel.

---

This invention relates to digital-logic trainers and more particularly is concerned with a trainer capable of displaying digital devices operatively connected in a circuit configuration which precisely duplicates the schematic diagram of the circuit under consideration.

The prior art is replete with digital-logic training devices of various types. Some of the types currently available are defined as desk-type trainers, their primary purpose being perhaps to permit the individual engineer to test performance of the circuit design and thus quickly examine the effects of circuit loading, timing differences, and input-signal variations. With these types, however, the utilization factor is relatively poor because a deck-type trainer is required for every two or three students. For an average sized class this would necessarily mean a relatively large initial investment while still imposing a relatively large burden on the instructor in his having to observe and check each of the student groups. Furthermore, because of the size, the study of the more complicated circuits is limited unless one or more of these trainers are interconnected, if such were in fact possible.

Aside from the desk-type of trainer are the various fixed-panel and rack-type consoles that stand on the floor. In these, many panels are provided, each containing a variable number of fixed configurations of logic circuits. With these, even the more complex circuits can be patched up on the appropriate panels of the trainer and the circuit performance quickly evaluated. The resulting circuit of interwoven patch cords rarely if ever resembles the circuit as it appears on the schematic diagram. To the engineer or any properly trained individual, this presents no problem. However, this is not the case for the trainee or the less informed and presents to the less gifted a serious obstacle which may never be overcome. Thus, the larger console type device fails to meet the needs necessarily characteristic of a digital-logic trainer without even considering the investment and utilization aspects which otherwise would likewise be fatal.

With the present invention, these disadvantages are aleviated if not virtually eliminated. Briefly, the present invention utilizes a panel having an array of openings for removably attaching the various digital devices which may be geometrically and/or color coded for ease in identification. Two types of panels are provided, one having a gridlike arrangement of openings extending through a panel assembly comprising two oppositely polarized conductive sheets each insulated from the other and the other having a somewhat similar array of three opening groups extending through a nonconductive material which has a backing of inclined bus bars parallelly arranged with adjacent bars of opposite polarity and in alignment with the corresponding openings of each group.

In the embodiment utilizing the panel assembly having two conductive sheets, the outer sheet which is the visible one is formed from material having magnetic properties. In addition, the diameter of the openings is larger in the outer or visible sheet as compared to the openings in the back or hidden conductive sheet. By providing a small magnet and an active plug on each of the digital devices, they may be removably attached to the panel assembly by inserting the plug in the desired opening and operatively connected in a circuit configuration precisely as shown in the schematic diagram. With such an arrangement, the trainee can quickly identify the particular component in the circuit under study and thereby devote his full attention to the remarks being made or to other matters under consideration.

The same results are achieved in the other embodiment which utilizes a nonconductive panel having inclined bars in appropriate alignment with the corresponding openings of each group. Here, the bus bars have aligned openings which serve as jacks to receive in electrical contact relationship two oppositively polarized active plugs which are provided on the digital devices. In this embodiment, magnets are not required. Also, the nonconductive panel provided may be appropriately finished allowing temporary or permanent notations to be made thereon for instructive and other purposes. Again, a precise reproduction of a circuit diagram as it appears in print may be operatively assembled and interconnected. Such a display communicates the maximum of information within the least amount of time and with the minimum of effort leaving time and energy for devotion to how the circuit operates and to what the circuit performance is in fact.

Both embodiments of the invention, as will be pointed out in full, are on a comparative basis substantially less expensive to manufacture than are the training devices comprising the state of the art. None of the digital devices is permanently wired to either of the display panels. Even the power supply may be connected by means of inexpensive connectors of the removable plug type. This means that the initial investment can be readily controlled and easily confined to within nominal budgets. When desired, additional sections can be acquired to accommodate larger and more complicated circuits for advance study and instruction. Both small and large classes of students can be efficiently trained by scaling the relative size of the panel and the digital devices accordingly.

Since, with the present invention, each digital device can be connected directly to the source of power, lights may be provided at the input and output terminals of each digital device and relay actuated by known techniques. With such an arrangement, the state of each device can be determined at a glance. This in particular is very helpful to both the instructor and the student. For the instructor, it eliminates his making a notation on the trainer or, for instance, on a blackboard only to erase such notation in total or in part and subsequently remake or remark them accordingly as the state or states of the various digital devices change in the course of circuit operation. Here, the input and output lights of each digital device can be actuated to visually indicate the state of each digital device at all times during circuit operation. The advantages of this to the student are apparent. The result is an inexpensive trainer capable of displaying a circuit to a student for study in a manner which is a true duplication of the printed diagram and which enables him to witness the state of each digital device used in the circuit at all times.

According to the invention there is provided a digital-logic trainer for displaying digital devices operatively arranged in schematic-like disposition comprising in combination frame means including a bracket, display means including a panel assembly supportedly mounted to the bracket, a plurality of openings disposed in the panel assembly in predetermined spaced apart relationship, means for removably attaching each of the devices to the display means in the schematic-like disposition, the devices each including a plug operatively coupled to the circuit means of the device and adapted to be removably received in the openings, a source of direct current voltage, and means including a conductor coupled between the panel assembly and the source for supplying power from the source to the digital devices through the plug. In such a trainer, the panel assembly may comprise a first sheet of conductive material, a second sheet of ferrous material, and a nonconductive layer disposed between the sheets and fastened thereto. In addition the openings may include a first portion co-extending with the first sheet and a second portion co-extending with the second sheet, the diameter of the second portion being larger than the diameter of the first portion. The digital devices may in turn include magnetic means operatively coupled to the circuit means of the digital device for engaging the second sheet in contact surface relationship therewith when the plug is engageably received in the first portion of the openings.

Another aspect of the invention includes a trainer having a different panel assembly, one comprising a sheet of nonconductive material having an array of openings disposed in L-like configuration and forming a three opening group, each of the groups being disposed in spaced apart relationship to form the array, that opening which is equidistant to openings of each respective group having a diameter other than the diameter of the other two openings to impart polarization thereto. Such a panel assembly further includes a plurality of inclined bus bars, alternate ones of the bus bars being coupled to different terminals of the source and in aligning disposition respectively with the other two openings and with the opening equidistant from the other two openings, each of the bars including a jack in alignment with the corresponding ones of the openings of each group. In this case each of the digital devices includes first and second polarized plugs adapted to be received respectively by alternate ones of the bus bars, the plugs being spaced apart by an amount equal to the distance between the other two openings and the third opening of each group.

It is therefore the primary purpose and objective of the invention to provide an improved digital and logic trainer.

It is another object of the invention to provide a trainer of the type described capable of displaying digital devices operatively disposed in schematic-like arrangement for visually augmenting the audio portion describing the circuit under study.

It is still another object of the invention to provide a trainer of the type described wherein the digital devices are magnetically held in place once positioned and interconnected in a configuration duplicating the written schematic diagram.

It is yet another object of the invention to provide a trainer of the type described utilizing a panel having a plurality of spaced apart openings for receiving digital devices having polarized plugs and adapted to be operatively received in the panel openings.

Another object of the invention is to provide a trainer of the type described utilizing a nonconductive panel having a plurality of spaced apart openings of predetermined polarity for removably supporting digital devices in either of two positions.

Still another object of the invention is to provide a trainer of the type described wherein the panel assembly may comprise a plurality of sections of predetermined width and height for selectively varying the overall size of the trainer.

Another object of the invention is to provide a trainer of the type described which is capable of supplying adequate power for a plurality of digital devices having input and output lights to visually indicate the state of the various devices at all times during circuit operation.

These and other features, objects and advantages of the invention will be more fully understood upon a reading of the specification taken in conjunction with the drawings wherein:

FIGURE 3 is a partial cross sectional view of the panels of FIGURES 1 and 2 taken along a line 3—3 of FIGURE 2;

FIGURE 4 is a cross sectional view of one type of digital device suitable for use with the invention taken along the line 4—4 of FIGURE 2;

FIGURE 5 is an exploded perspective view of a portion of the embodiment shown in FIGURE 1 as seen from the rear;

FIGURE 6 is a schematic circuit diagram which the circuit arrangement shown in FIGURE 2 duplicates precisely;

FIGURE 7 is a partial front elevation view of the right portion of FIGURE 1 wherein a different arrangement of the openings in the panel is used and showing another type of digital device suitable for use in the invention;

FIGURE 8 is a cross sectional view of the digital device shown in FIGURE 7; and

FIGURE 9 is a partial perspective view as seen from the rear of the right portion of the panel of FIGURE 1.

Figure 1:
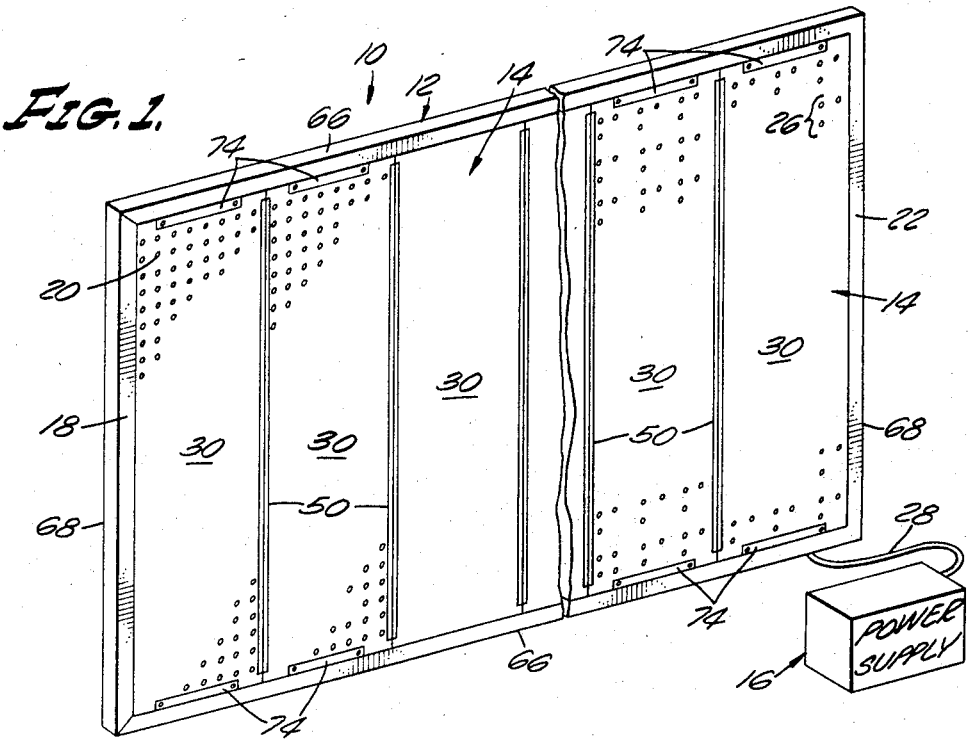
FIGURE 1 is a perspective view showing a panel of the type used in the invention, the left and right portions thereof respectively illustrating different arrangements of the openings provided therein.

Referring now to the drawings, in FIGURE 1 there is shown a trainer 10 in accordance with the invention comprising a frame 12, a panel assembly 14, and a power supply 16.

For descriptive purposes, the panel assembly 14 is divided into a left portion 18 having a plurality of spaced apart openings 20 disposed in gridlike fashion and a right portion 22 having a plurality of openings 24 arranged in three-opening groups 26 for reasons to be described. A cable 28 is provided for supplying power through the panel assembly 14 from the power supply 16, which may be a battery or a conventional power supply receiving power from the local utility, not shown. If desired, the panel assembly 14 may comprise two or more sections 30 for ease of handling and to permit size variations.

Figure 2:
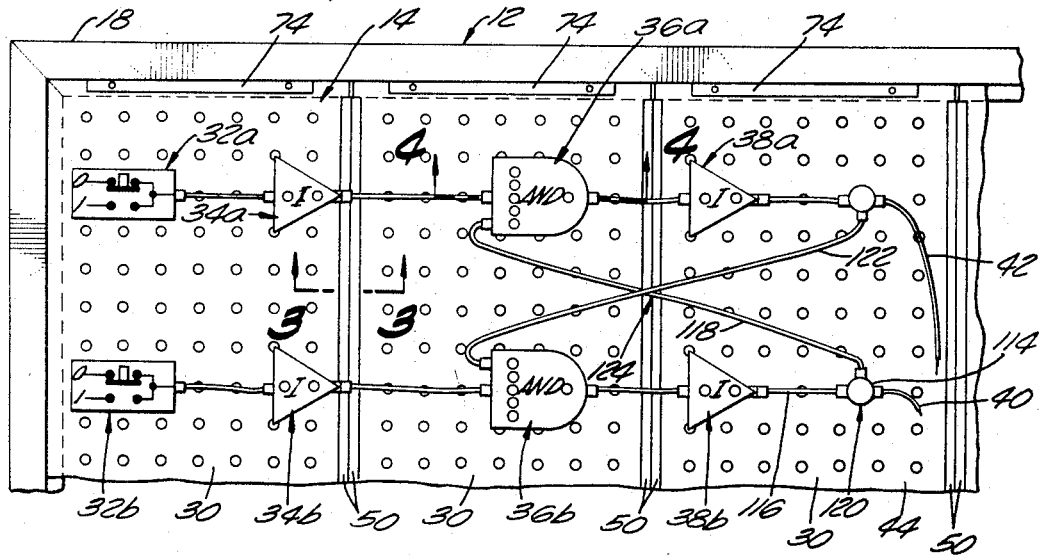
FIGURE 2 is an enlarged partial front elevation view of the left portion of FIGURE 1 showing an operative arrangement of digital devices removably mounted to the panel.

In FIGURE 2, an enlarged partial view of the left portion 18 of the panel assembly 14 is shown on which is operatively mounted switch modules 32a and 32b, inverter modules 34a and 34b, and a flip flop module comprising AND gates 36a and 36b suitably connected to inverter modules 38a and 38b. The main purpose of showing this switching circuit is to illustrate the fact that the digital devices 32, 34, 36, and 38 can be operatively mounted to the panel assembly 14 and patched together with cords in an arrangement which precisely duplicates the schematic diagram normally used to represent such a circuit as shown in FIGURE 6.

Assuming the switch modules 32a and 32b represent the stop and start operational functions respectively, upon actuating the start module 32b, a voltage representing a true signal is applied to the inverter module 34b resulting in a false signal at the input and hence at the output at the AND gate 36. This false signal is inverted to a true signal by the inverter 38b and applied to one of the inputs of the AND gate 36a which has also a true signal from the inverter 34a since the switch 32a is in the up or false position. The output of the AND gate 36a hence is true, and this true signal becomes a false at the output of the inverter 38a which is also coupled to an input of the AND gate 36b. The output of the inverter 38b is transmitted over a conductor 40 and fed to a utilization circuit not shown.

To stop the circuit operation, the stop module 32a is actuated and the true signal applied to the inverter 34a becomes false at its output and changes the output of the AND gate 36a from true to false. The output of the inverter 38a is in turn inverted from false to true and this true signal, which is applied to the input of the AND gate 36b, being the same as the true signal at the output of the inverter 34b since the start module 32b is applying a false signal to the input of the inverter 34b, causes a true signal and in turn a false signal at the outputs of the AND gate 36b and the inverter 38b respectively. The true signal previously appearing on the conductor 40 is now a false signal and the utilization circuit, not shown, responds accordingly. If desired, the output of the inverter module 38a may be transmitted over a conductor 42 for any purpose such as, for example, to set or reset some desired device.

As best seen in FIGURES 3, 4 and 5, the panel assembly 14 includes an outer or visible sheet 44 and a back or hidden sheet 46 with a layer 48 of nonconductive material disposed between the sheets 44 and 46. A stainless steel such as type 410 may be used for the sheet 44 whereas aluminum is preferred for the sheet 46. Other materials having substantially similar properties may be used respectively for the sheets 44 and 46. For the nonconductive layer, a double gummed paper of suitable strength may be used. Where several sections 30 are used to make up the panel assembly 14 as shown in FIGURES 1 and 2, a nonconductive strip 50 having a C-type cross sectional configuration may be used, reference FIGURE 3, to help hold the sheets 44 and 46 in contact with the nonconductive layer 48 at the adjacent sides of each section 30.

As best seen in FIGURE 4, the diameter of the openings 20 is larger in the sheet 44 relative to the sheet 46 for reasons to be described.

The AND gate 36a, shown in cross section in FIGURE 4, comprises a base plate 51, a front plate 52 having several input jacks 53, a side wall 54 having an output jack 55, and a top plate 56 having input lights 57 and an output light 58. One or more magnets 60 are fastened to the base plate 51 as by rivets 59 which in turn are electromagnetically coupled to a conventional circuit means 62 which, in this case, is an AND gate circuit. The input and output jacks 53 and 55 respectively and the input and output lights 57 and 58 respectively are operatively coupled in a similar manner to the circuit means 62. An active plug 64, which may be inserted in any of the openings 20 to position any digital device, here the AND gate 36a, as desired on the panel assembly 14, is threadedly mounted on the base plate 51 and electrically connected to the circuit means 62. With this arrangement, one polarity of the power supply 16 may be connected by way of the cable 28 to the plug 64 through the conductive sheets 46 and the other polarity may be similarly connected to the magnet 60 through the conductive sheet 44 for supplying power to the circuit means 62. By making the opening 20 in the sheet 44 larger than in the sheet 46, the plug 62 may establish electrical contact with the sheet 46 and yet remain spaced apart in electrical isolation from the sheet 44 as shown by reference numeral 65. Such an arrangement prevents a short circuit between the sheets 44 and 46.

FIGURE 5 shows a preferred embodiment of the frame 12 in the manner in which panel assembly 14 is attached thereto. The frame 12, which preferably is rectangular in configuration, may include a bottom and a top member 66, and side member 68. An extrusion of, for example, aluminum, having a bracket 70 may be used for the members 66 and 68. Each section 30 of the panel assembly 14 may in turn be attached to the bottom and top member 66 with threaded fasteners 72 which may be a steel core nylon machine screw and nut combination. The panel assembly 14 is placed against the bracket 70 and a distribution bar 74 placed along the lower and upper edge of the sheet 44 and held in place by the fasteners 72 which are received in openings 76 extending through the bracket 70, the panel assembly 14 and the bar 74. If desired, the spacer bar 78 may be used to position the panel assembly 14 and to assure a proper electrical connection to the sheet 46.

The bottom member 66 is provided with a terminal block 80 of insulating material having lugs 82 and 84 to which the power supply 16 is terminated at the ends of the cable 28 by conventional nuts 86. If desired, the lug 82 may in turn be electrically connected through a wire 88 to a bottom member 66 by means of a screw 90 which is provided to mount the terminal block 80 to the bottom member 66. To connect the lug 84 to the distribution bar 74, a wire 92 is provided.

In FIGURES 7, 8 and 9 is shown a different embodiment of the panel assembly 14 comprising a nonconductive sheet 94 having openings 24 arranged in groups 26. Each of the groups 26 upon drawing imaginary lines to the openings 24 thereof depicts a triangle comprising an apex opening 100a and two base line openings 100b and 100c as shown in FIGURE 7 and referenced here as such only for explanatory purposes.

On the hidden or back side of the sheet 94 are mounted inclined bus bars 96 and 98 of opposite polarity. The bus bar 96 are arranged in alignment with the openings 24 which form the apex of the triangle just mentioned and shown in FIGURE 7 by the reference numeral 100a. In FIGURE 9, a reference numeral 102 represents the location of the corresponding openings 100a of each three opening groups 26. The other openings 100b and 100c of each group 26 are interconnected by the bus bars 98 which as seen in FIGURE 9 are terminated at a lower horizontally disposed interconnecting bus bar 104. In a similar fashion, the bus bars 96 may be terminated at upper horizontally disposed interconnecting bus bars 106. Other arrangements may be used such as the bus bars 102 and 104 may be located near each other at either the top or bottom of panel assembly 14. It should be noted that none of the bars 96, 98, 104 and 106 makes contact with the frame 12 however although this is not a necessary restriction. Here, the terminals of the power supply 16 may be connected directly to the interconnecting bus bars 104 and 106 respectively or in a manner similar to the terminal block arrangement described in conjunction with FIGURE 5.

As best seen in FIGURE 8, the bus bars 96 and 98 respectively are mounted to the nonconductive sheet 94 by eyelets 108, the back portion of which appears also in FIGURE 9. Should additional sections of the sheet 94 be used as shown in FIGURE 1, the strip 50 may be used as described in conjunction with FIGURE 3.

It should be pointed out that where several sections 30 are used, the interconnecting bus bars 104 and 106 respectively are connected together with a jumping strap, not shown, to provide circuit continuity. The same applies to the distribution bars 74 of FIGURES 1, 2 and 5.

In FIGURE 8, the AND gate 36a of FIGURE 7 is shown in cross section and for descriptive purposes is the same AND gate 36a shown in FIGURE 4 with the exception that two active plugs 110 and 112 are provided and the magnet 60 eliminated. The plugs 110 and 112 are spaced apart for selective insertion into two of the three openings 24 of any group 26. For example, in FIGURE 7, the plug 110 may be polarized as for example by size, and inserted only in the opening 100a of any of the three opening groups 26 to establish circuit continuity between the circuit means 62 and the bus bars 96. The other plug 112 in turn may be similarly polarized and insertable only in either the openings 100b or 100c of any of the groups 26. In this way, the digital devices such as the AND gate 36a can be mounted as shown in solid delineation in FIGURE 7 with the input terminals directed towards the left or towards the top, not shown. If desired, the plugs 110 and 112 may be polarized, as to size for example in an opposite manner whereby the input terminals of the digital device may be directed downwardly as shown in delineation in FIGURE 7 or towards the right, not shown, which is opposite to the position shown of the AND gate 36a. The same flexibility can be achieved by rotating the L-like arrangement of the openings 24 which form each three-opening groups 26 along the vertical axis to obtain a reverse L-like configuration instead of rotating in along the horizontal axis and obtaining the inverted L-like configuration shown in FIGURE 1 at the right portion 22 and in FIGURES 7 and 9.

As in the case of the plug 64, and the magnet 60, the plugs 110 and 112 are electrically connected at the proper terminals of the particular circuit means 62 as shown in FIGURE 8.

It should be understood that the AND gate 36a is shown in FIGURES 4 and 8 merely for descriptive purposes and therefore any one of the inverters 34a, 34b, 38a, or 38b, as well as either of the switch modules 32a and 32b could have been shown and described instead. All of these digital devices as well as devices of other types not shown are provided with either the plug 64 and the magnet 60 combination as shown in FIGURE 4 or with plugs 110 and 112 as shown in FIGURE 8 depending upon which type of panel assembly 14 described above is used. For this reason, the circuit means 62 is to be understood as representing the appropriate well known circuit suitable to achieve the particular function desired as the name of the digital device, for example, the AND gate 36a, describes. Thus, the FIGURES 4 and 8 may be applicable to NOR gates and other well known digital devices used in computer and logic circuits.

In view of the above description, it should be clear that the invention comprises an inexpensive and reliable trainer in which the various digital devices may be operatively connected and displayed in an exact duplicating configuration of the schematic diagram and as printed or drawn by the engineer or the instructor or the student. The overall size of the trainer in regards to the frame and panel assembly as well as to the various digital devices may be scaled accordingly. This means large groups of students can be officially and properly trained without imposing undue strain visually. Adequate power can always be supplied by using a larger power supply or several of them each connected to various sections isolated from the other if desired. Since adequate power can always be provided, there is no reason why input and output lights cannot be used to further enhance the visual transfer of information. This means the state of each digital device is displayed instantaneously and, as in the case of manual switching by, for example the instructor, both he and the student can observe and evaluate circuit performance at any and all times as desired.

The duplication of the circuit schematic can be further improved by providing circular connectors, reference numeral 114 in FIGURE 2, to which patch cords such as the cords 116 and 118 may be connected at a junction 120, again reference FIGURE 2. It will be observed that the circuit connector 114 when interconnecting the patch cords 116 and 118 and the conductor 140 takes on the appearance similar to the solid circle used on a typical schematic to represent an electrical connection as shown in FIGURE 6. Patch cords that merely cross each other, such as the patch cords 118 and 122 crossing at a point 124 in FIGURE 6, take on an appropriately similar appearance. All this greatly helps the trainee understand not only circuit performance but circuit arrangement and bread-boarding.

While the invention has herein been shown and described in what is conceived to be the most practical and preferred embodiment, it is recognized that departures may be made therefrom within the scope of the invention, which is to be accorded the full scope of the claims so as to embrace any and all equivalent devices.

Having described the invention, what is claimed as new in support of Letters Patent is:

1. A digital-logic trainer for displaying digital devices operatively arranged in schematic-like disposition comprising in combination:
   frame means including a bracket;
   display means including a panel assembly supportedly mounted to said bracket;
   a plurality of openings disposed in said panel assembly in predetermined spaced apart relationship;
   means for removably attaching each of said devices to said display means in said schematic-like disposition, said devices each including a plug operatively coupled to the circuit means of said devices and adapted to be removably received in said opening;
   a source of direct current voltage; and
   means including a conductor coupled between said panel assembly and said source for supplying power from said source to said digital devices through said plug;
   further characterized in that said panel assembly comprises a first sheet of conductive material, a second sheet of ferrous material, and a nonconductive layer disposed between said sheets and fastened thereto;
   in that each of said openings includes a first portion coextending with said first sheet and a second portion coextending with said second sheet, the diameter of said second portion being larger than the diameter of said portion;
   in that each of said digital devices includes magnetic means operatively coupled to the circuit means thereof for engaging said second sheet in contact surface relationship therewith when said plug is engageably received in said first portion of said opening; and
   in that said conductor means includes means for connecting said first and second sheets respectively to one and to the other of the terminals of said power source.

2. The trainer in accordance with claim 1 further characterized in that said frame means includes oppositely disposed support members, said bracket extending outwardly along each of said support members and towards the other of said support members;
   in that said panel assembly comprises a plurality of sections, the upper and lower ends thereof being attached to said support members in electrical contact relationship;
   in that there is provided elongated clip means extending along the upright sides of said sections for urging said first and second sheets in surface contact relationship with said nonconductive layer.

3. The trainer in accordance with claim 2 further characterized in that said frame means includes a terminal block mounted to one of said support members, one terminal of said block being connected to said support member and the other terminal of said block being connected to said first sheet of conductive material, preselected ones of the terminals of said power supply being electromagnetically coupled to the terminals of said block.

4. The trainer in accordance with claim 3 further characterized in that said digital device includes an input light and an output light operatively coupled to the circuit means of the respective digital device for displaying the instantaneous state thereof.

5. A digital-logic trainer comprising, in combination:
   a large flat panel adapted to be vertically disposed for visual display before a group of students, said panel having a plurality of spaced-apart digital device locations provided thereon, each of said digital device locations being characterized by at least one opening formed in the front of said panel;

a plurality of digital-logic circuit devices removably attached to the front of said panel in respective ones of said device locations, each of said circuit devices having a pair of connecting devices which engage said panel for supporting said circuit device and concurrently supplying electrical energy thereto, at least one of said connecting devices being a plug which extends through said one opening of said panel;

electrical power circuit means cooperatively associated with the rear of said panel and with said openings therein, for supplying energy to said circuit device connectors;

and separate circuit means, disposed in front of said panel, detachably interconnecting the logic inputs and logic outputs of various ones of said digital-logic circuit devices;

each of said digital-logic circuit devices including a separate indicating light for indicating the state of its output and each of its inputs, whereby the student group may observe the changes in circuit operation which occur as the instructor progressively varies the arrangement and interconnections of said digital-logic circuit devices.

6. A digital-logic trainer as claimed in claim 5 wherein said panel is a three-layer panel, the front and rear layers thereof being formed of conductive material while the center layer thereof is formed of electrical insulating material; said power circuit means including a power source coupled to said front and rear layers of said panel to energize the same in opposite polarity; one of said connectors of each said circuit devices engaging said front layer of said panel, while the other connector thereof extends through said one opening to engage said rear layer of said panel, said opening being larger in said front and center layers of said panel than in said rear layer thereof.

7. A digital-logic trainer as claimed in claim 5 wherein said panel is made of electrical insulating material; at least two openings are provided in said panel at each of said digital device locations; and said power circuit means includes a pair of electrical conductors passing on the rear side of said panel at each of said digital device locations; each said digital-logic circuit device including a pair of plugs which extend through said openings in said panel and retentively engage openings formed in said electrical conductors.

References Cited

UNITED STATES PATENTS

| | | | |
|---|---|---|---|
| 3,059,152 | 10/1962 | Khouri | 317—101 |
| 3,061,945 | 11/1962 | Hawkins | 35—13 |
| 3,062,991 | 11/1962 | Kaidan | 35—19 X |
| 3,175,304 | 3/1965 | Och et al. | 35—19 |

EUGENE R. CAPOZIO, *Primary Examiner.*

H. S. SKOGQUIST, *Assistant Examiner.*